United States Patent [19]

Wakabayashi

[11] Patent Number: 5,025,884

[45] Date of Patent: Jun. 25, 1991

[54] FREE WHEEL HUB SYSTEM

[75] Inventor: Hideaki Wakabayashi, Nagoya, Japan

[73] Assignee: Aisin Seiki Kabushiki Kaisha, Kariya, Japan

[21] Appl. No.: 456,525

[22] Filed: Dec. 26, 1989

[30] Foreign Application Priority Data

Dec. 28, 1988 [JP] Japan ................. 63-328989

[51] Int. Cl.⁵ .............................................. B60K 23/08
[52] U.S. Cl. ......................................... 180/247; 403/1; 192/84 R
[58] Field of Search ............... 180/247; 403/1; 192/0.02 R, 84 R; 361/398

[56] References Cited

U.S. PATENT DOCUMENTS

| 4,399,488 | 8/1983 | Ruwe et al. | 361/398 |
| 4,833,568 | 5/1989 | Berhold | 361/398 |
| 4,899,856 | 2/1990 | Kurihara | 192/0.02 R |
| 4,928,804 | 5/1990 | Wakaboyashi | 180/247 |

FOREIGN PATENT DOCUMENTS

| 0060735 | 5/1980 | Japan | 192/84 R |
| 0012336 | 1/1985 | Japan | 180/247 |
| 0078929 | 3/1989 | Japan | 180/247 |
| 0090823 | 4/1989 | Japan | 180/247 |

Primary Examiner—Charles A. Marmor
Assistant Examiner—Mitchell Bompey
Attorney, Agent, or Firm—Burns, Doane, Swecker & Mathis

[57] ABSTRACT

A free wheel hub system comprises a free wheel hub mechanism disposed between a drive shaft and an axle hub supported by a spindle and a flexible print circuit disposed between the inner face of the spindle and the outer face of the drive shaft to control an electric element in the free wheel mechanism.

10 Claims, 4 Drawing Sheets

FREE WHEEL HUB SYSTEM

BACKGROUND OF THE INVENTION

1. Field of the Invention

The invention relates to a free wheel hub in a four wheel drive automobile, especially the wiring connecting a battery to an actuator and a sensor set in the free wheel hub mechanism.

2. Description of the Prior Art

A prior art free wheel hub system is equipped with a sensor which indicates the operating condition of the free wheel hub to the driver and an actuator, like an electric motor, which changes the four wheel driving condition to the two wheel driving condition, in the axle hub or vice versa.

The prior art shown in FIG. 7 shows a free wheel hub system equiped with a switch sensor 2 so as to indicate the operating condition of the free wheel hub to the driver. When the free wheel hub system changes to the four wheel driving condition, by the operation of a hub ring 5 rotating with a drive shaft 3 and an inner hub 4, a roller case 7 moves to the left side shown in the FIG. 7 with a roller 6, and contacts a movable part 2a of the switch sensor 2 fixed on the outer side of spindle 1, and further the roller 6 engages a clutch housing 8 and the inner hub 4. Thereby the switch sensor 2 is switched ON and the transmitting of the driving force from the drive shaft 3 to the wheel is indicated. An indicator (not shown in FIG. 7) mounted in a clashboard is connected to the switch sensor 2 through an electric cord 9 which is wired through a hole 1A formed in the spindle 1, or as shown in FIG. 8, along a groove 1B formed on the inner face of the spindle 1.

The above mentioned free wheel hub system has the drawback in that the spindle 1 must have a reduced load, because the forming of the hole 1A or the groove 1B reduces the load spindle 1 can carry. Therefore, the transferable torque load of such a free wheel hub system is limited. Further it is impossible to design the hole 1A or the groove 1B to be large, and therefore the diameter of the electric cord 9 is limited. Thus, cord 9 may break down during assembly or as a result of the vibrations received from the wheel.

Thus the free wheel hub system is not reliable. Further, the greatest care must be used in mounting the drive shaft 3 to the spindle 1 or cord 9 will be broken. This process takes much time.

SUMMARY OF THE INVENTION

It is an object of the invention to provide a free wheel hub system to obviate the above mentioned drawbacks of conventional systems. In order to accomplish the object, a free wheel hub system is comprised of a free wheel hub mechanism disposed between a drive shaft and an axle hub supported by a spindle, and a flexible print circuit disposed between the inner face of the spindle and the outer face of the drive shaft to control electric elements of the free wheel hub mechanism.

Figure 1:
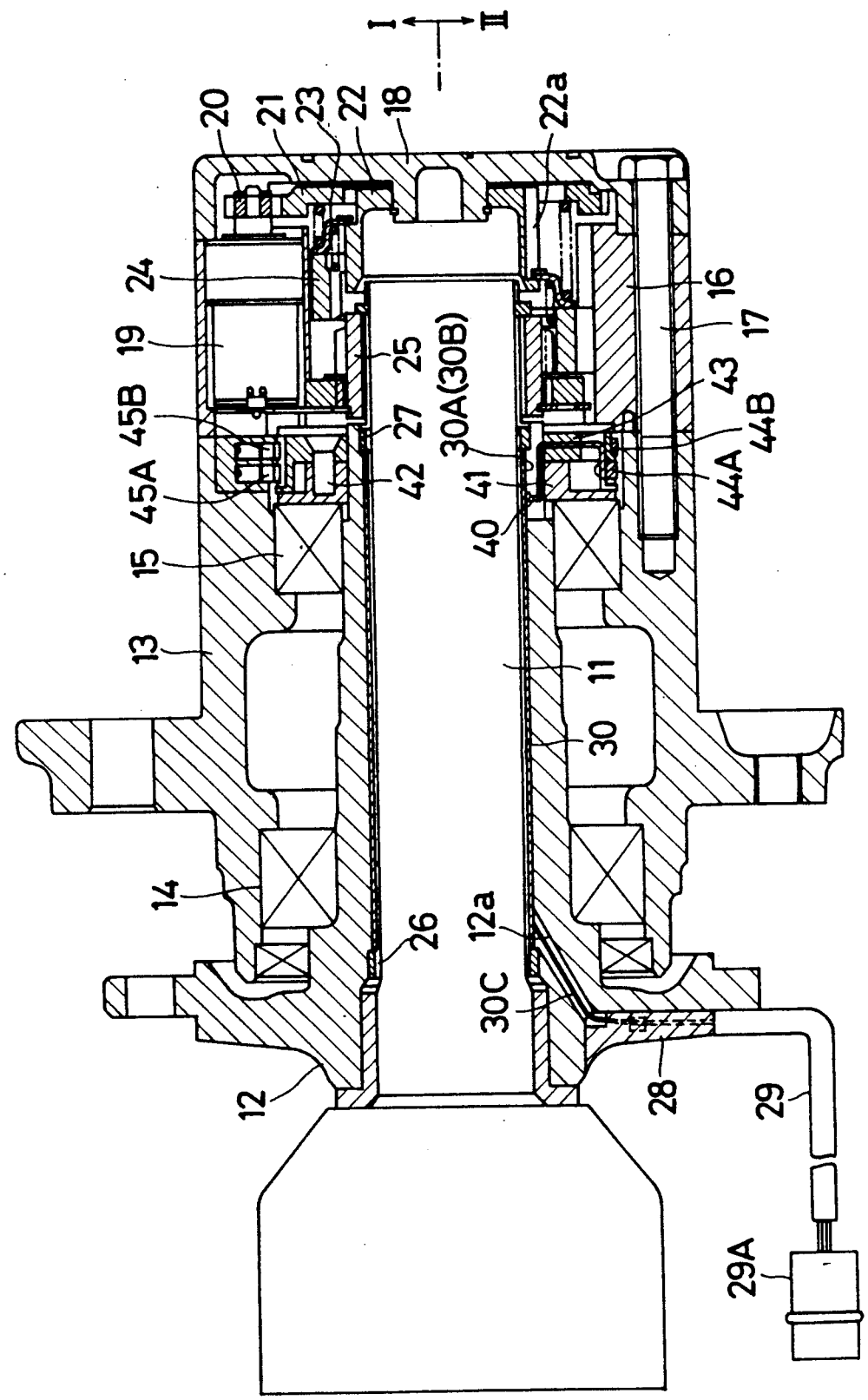
FIG. 1 shows a sectional view of a free wheel hub system of this invention.

In a preferred embodiment of the free wheel hub system shown in FIG. 1, a spindle 12 is mounted on a drive shaft 11 so as to rotate simultaneously, an axle hub 13 is mounted on the spindle 12 through bearings 14, 15, a hub body 16 and a hub cover 18 are fixed to the axle hub 13 by a bolt 17, and an electric motor 19 is mounted in the hub body 16.

Between the drive shaft 11 and the axle hub 13, a well-known free wheel hub mechanism comprising a motor gear 20, a handle gear 21, a handle 22, a cam follower 23, an outer clutch 24 and an inner clutch 25, is disposed.

By the rotation of the electric motor, the motor gear 20 rotates the handle gear 21 on the handle 22, and thereby the cam follower 23 moves to the left side shown in FIG. 1 along a cam face 22a formed on the outer face of the handle 22 and engaging with the cam follower 23. The cam follower 23 causes the outer clutch 24 to engage with the inner clutch 25 rotating with the drive shaft 11. Thereby the rotating torque of the drive shaft 11 is transmitted to the axle hub 13 and the four wheel driving condition is accomplished.

Figure 2:
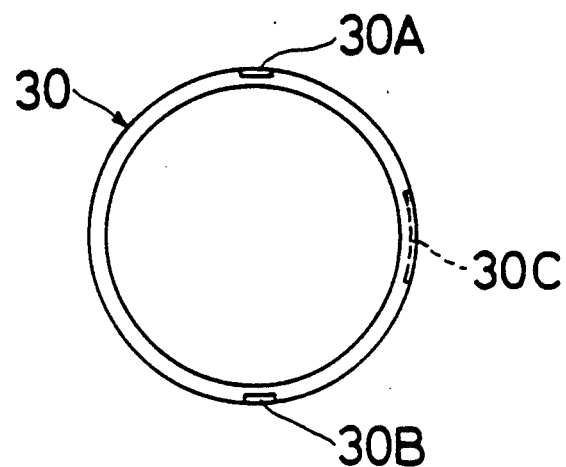
FIG. 2 shows a front sectional view of a flexible print circuit of the FIG. 1.
Figure 3:
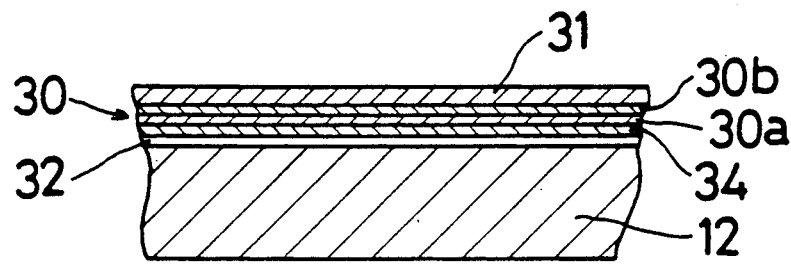
FIG. 3 and 4 show a sectional view of a part of a flexible print circuit showing the construction means.
Figure 4:
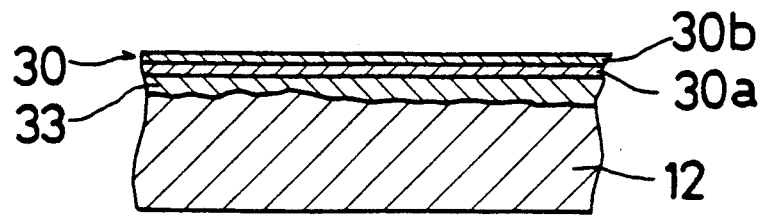
Figure 5:
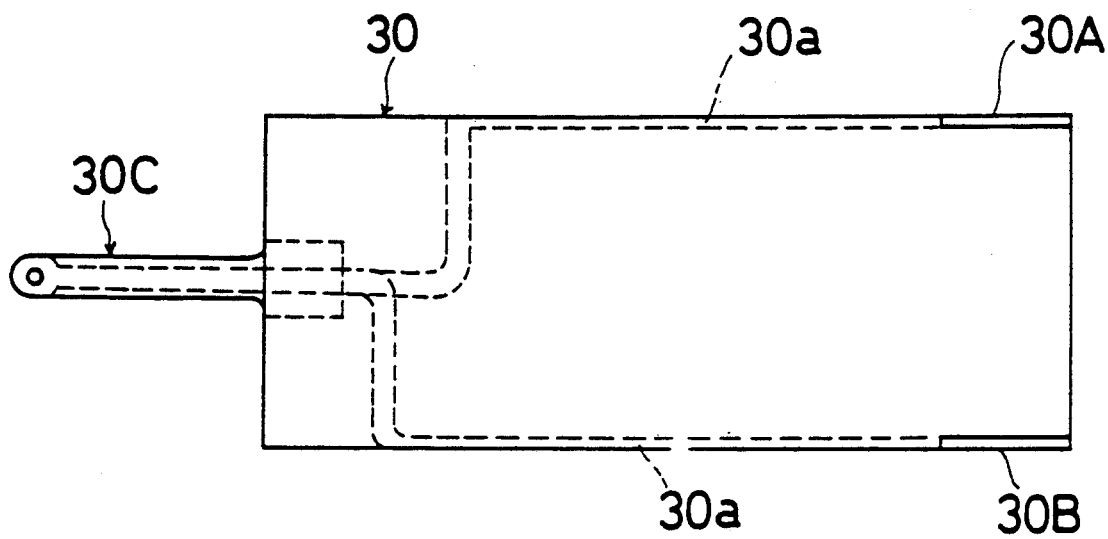
FIG. 5 shows a side view of an embodiment of a flexible print circuit.
Figure 6:
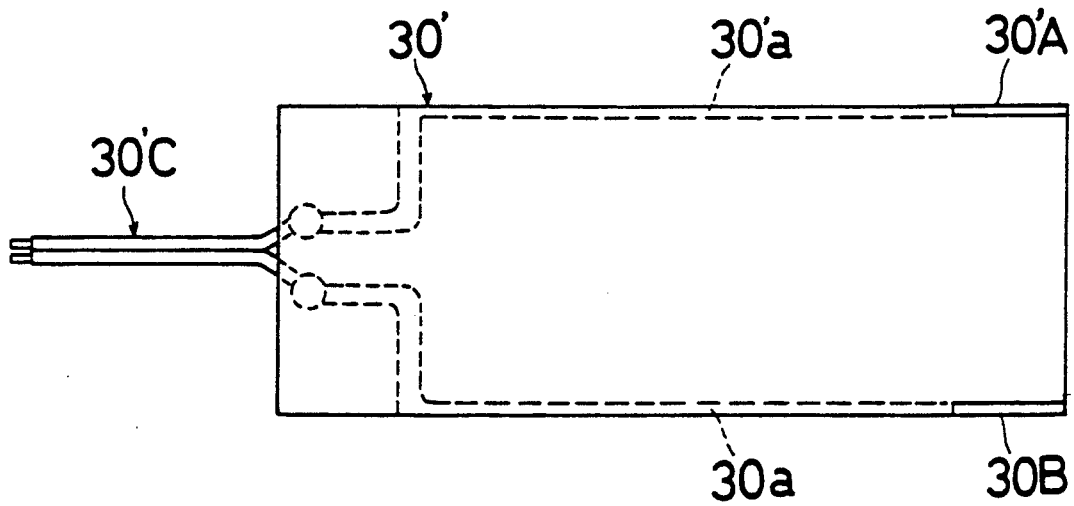
FIG. 6 shows a side view of another embodiment of a flexible print circuit.

The current from the battery to the electric motor 19 flows through the flexible print circuit 30 mounted between the inner face of the spindle 12 and the outer face of the drive shaft 11. The flexible print circuit 30 has a cylindrical form as show in FIG. 2, and comprises a conductor layer (Cu) 30a and a coating layer (resin) 30b. In another embodiment shown in FIG. 3, the flexible print circuit 30 is rolled on a collar 31, covered by coating layer (resin) 34, and is mounted on the spindle 12 with a small clearance 32. In yet other embodiment, shown in FIG. 4, the flexible print circuit 30 is fixed on the spindle 12 by an adhesive (resin) 33. As shown in FIGS. 5 and 6, on the outer face of one end of the flexible print circuits 30, 30' with the collar 31, the conductor layer 30a is exposed as terminals 30A, 30B, 30A', 30B' for the electric motor 19, on the other end, wires 30C, 30C' are connected to the battery. The flexible print circuit 30 is mounted on the spindle 12 by bushes 26, 27 on both ends to prevent axial movement The wire 30C passes through a hole 12a of the spindle 12 to the outer side of the spindle 12 in a protector 28, and is linked to a cable 29 ending in a connector 29A. Each of the terminals 30A, 30B contacts each of the ends of leaf springs 40 hold by the plastic lock-plate 43 fixed by screws 42 to a lock-nut 41 rotating with the spindle 12. Each of the outer ends of the terminals 30A and 30B is connected to each of the slip-rings 44A and 44B on the outer face of the lock-plate 43. Each of the brushes 45A and 45B, which are connected to the terminals of the electric motor 19, contact each of the slip-rings 44A and 44B.

The connector 29A is linked to the battery, Current form the battery flows through the cable 29 to the electric motor 19 through wire 30C, the conductor layer 30a, the terminals 30A and 30B, the leaf springs 40, the slip-rings 44A and 44B and the brushes 45A and 45B. Thus the motor 19 is driven and changes the two wheel driving condition to the four wheel driving condition vice versa.

In FIG. 1, the upper part I shows the two wheel driving condition, in which the outer clutch 24 does not engage the inner clutch 25, and the lower part II shows the four wheel driving condition, in which the outer clutch 24 engages the inner clutch 25.

Figure 7:
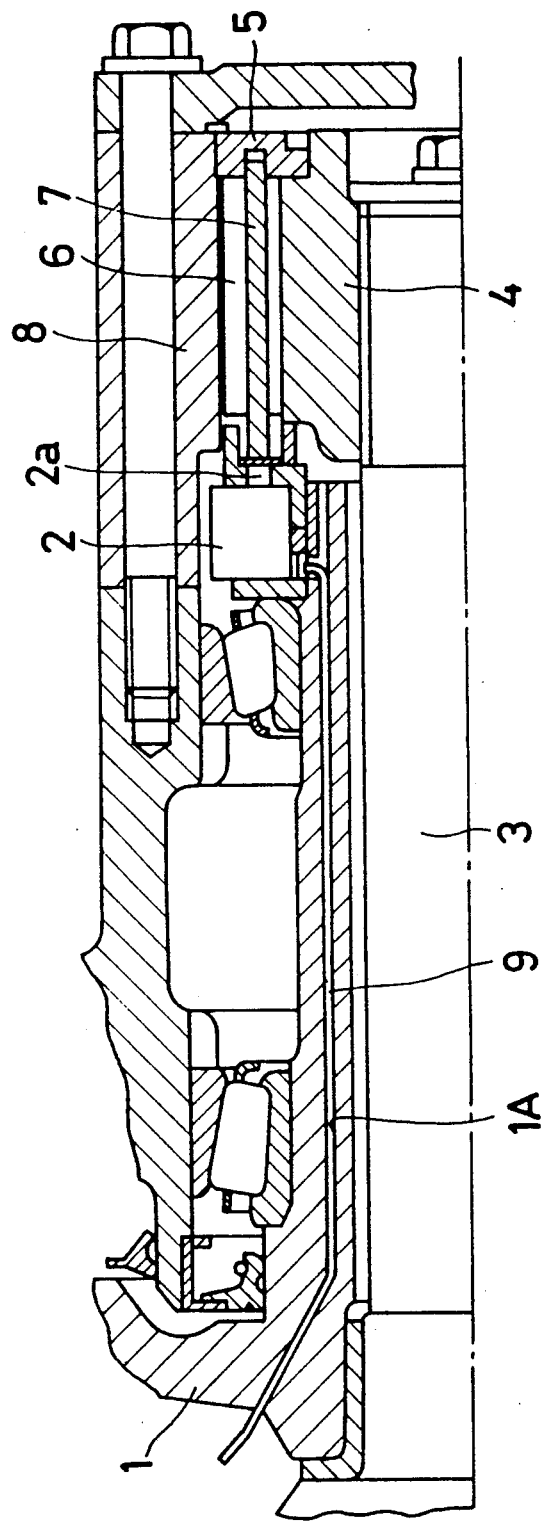
FIG. 7 shows a sectional view of a free wheel hub system of prior art.
Figure 8:
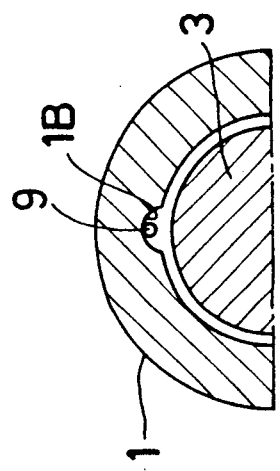
FIG. 8 shows a front sectional view of a free wheel hub system of another prior art.

It is possible to use a sensor as shown in FIG. 7 in place of the electric motor 19. It is also possible to fix the flexible print circuit on the outer face of the drive shaft.

If the flexible print circuit is mounted between the drive shaft and the spindle as described above, it is not necessary to form a hole or a groove axially for the wire, therefore the strength of the spindle is not reduced, and the free wheel hub system is easy to assemble, and further the wire can't be broken and the reliability of the system is increased. The design and the addition of terminals or connectors is easy, because the terminals or the connectors can be located on any place of the circumference.

What is claimed is:

1. A free wheel hub system comprising:
   a free wheel hub mechanism disposed between a drive shaft and an axle hub supported by a spindle, and containing an electric element;
   a flexible printed circuit disposed between an inner face of said spindle and an outer face of said drive shaft and connected to said electric element of said free wheel hub mechanism, said printed circuit including a conductor layer and an overlying coating layer.

2. A free wheel hub system according to claim 1 wherein said flexible printed circuit has a cylindrical form along said inner face of said spindle.

3. A free wheel hub system according to claim 1 wherein said electric element comprises an electric motor mounted on said axle hub.

4. A free wheel hub system according to claim 1 wherein said electric element comprises a sensor.

5. A free wheel hub system according to claim 1 wherein said flexible printed circuit is mounted on said inner face of said spindle.

6. A free wheel hub system according to claim 1 wherein said flexible printed circuit is mounted on said outer face of said drive shaft.

7. A free wheel hub system according to claim 1, wherein said flexible printed circuit is attached to the inner surface of the spindle by an adhesive.

8. A free wheel hub system according to claim 7, wherein said flexible printed circuit is mounted on the spindle by way of bushes positioned at opposite ends of the spindle for preventing axial movement of the flexible printed circuit.

9. A free wheel hub system according to claim 1, wherein said flexible printed circuit is disposed on a collar and is covered by an additional coating layer, said printed circuit being mounted on the spindle with a clearance space being provided between the additional coating layer and the inner surface of the spindle.

10. A free wheel hub system according to claim 1, wherein said flexible printed circuit is mounted on the spindle by way of bushes positioned at opposite ends of the spindle for preventing axial movement of the flexible printed circuit.

* * * * *